United States Patent

[11] 3,618,706

| [72] | Inventor | Bob J. Wall<br>1804 South High, Oklahoma City, Okla. 73128 |
|---|---|---|
| [21] | Appl. No. | 36,940 |
| [22] | Filed | May 13, 1970 |
| [45] | Patented | Nov. 9, 1971 |

[54] AUTOMATIC LUBRICANT DISPENSING APPARATUS
13 Claims, 2 Drawing Figs.

[52] U.S. Cl. .................................................. 184/1 R,
83/169, 222/167, 222/367
[51] Int. Cl. ........................................................ F16n 1/00,
B26d 7/08
[50] Field of Search............................................ 184/1, 66,
71, 80; 83/169; 81/2; 222/167, 168, 169, 367, 368, 369, 170

[56] References Cited
UNITED STATES PATENTS
| 2,111,287 | 3/1938 | Hoffmann | 184/1 |
| 2,924,876 | 2/1960 | Lewis | 184/1 X |
| 2,956,711 | 10/1960 | Mortara et al. | 222/170 |
| 3,341,237 | 9/1967 | Anzalone | 184/1 X |

*Primary Examiner*—Manuel A. Antonakas
*Attorney*—Dunlap, Laney, Hessin & Dougherty ABSTRACT: Apparatus for dispensing limited quantities of fluids, such as fluid lubricants, at predetermined times, and specifically relates to apparatus for dispensing lubricant to the dies on a pipe threading tool. A preferred embodiment of the apparatus includes a torus-shaped reservoir in which a quantity of cutting oil is placed. On the radially inward surface of the reservoir may be provided a fluid outlet which communicates with a dispensing tube mounted on the reservoir, the outlet end of the tube being positioned immediately adjacent a cutting die. Inside the reservoir, trap means are provided for moving a portion of the lubricant in an upward direction during rotation of the reservoir for discharge through the dispensing tube.

PATENTED NOV 9 1971 3,618,706

INVENTOR
BOB J. WALL
BY
Dunlap, Laney, Hessin & Dougherty
ATTORNEYS

AUTOMATIC LUBRICANT DISPENSING APPARATUS

BACKGROUND OF THE INVENTION

One of the more common activities engaged in by builders, and in some cases by electrical contractors, is the installation of various arrays of metal pipe. In installing such pipe, it is often necessary to cut it to particular lengths and thereafter to thread the ends of the pipe joints to provide attachment for the other portions of the piping array.

In threading the ends of pipe, quite commonly a portable pipe threader is used which has a plurality of extremely hard metal teeth which function to provide the cutting section for the threads. Because the metal of the pipe is quite hard, friction can become a problem even though ordinarily the portable threading tool does not move at a particularly high rate of speed. Nevertheless, unless lubrication is provided to the pipe cutting dies, an irregular, ragged cut will result with an attendant rapid dulling of the threading dies.

It is common practice for the workman employing a portable pipe threading tool to use an ordinary squirt can to provide lubricant to the dies. This kind of an arrangement is satisfactory insofar as the ultimate purpose of the lubricant is concerned, and it is used by workmen the world over. One of the disadvantages of this kind of an operation, however, resides in the fact that the threading operation must be interrupted to allow the oil can to be picked up to dispense the oil on the pipe. Moreover, an inattentive workman may forget to lubricate the pipe at proper intervals, thereby creating imperfect threads and dulling the dies. One possible way of handling these two problems resides in the provision of an extra man whose sole task during the threading operation is to dispense lubricant from the squirt can onto the surface of the pipe. While the provision of such an extra worker will certainly solve the technical problems involved, it introduces an economic factor which should be avoided if possible.

Because of the need for automatic lubrication, it is not surprising that a number of attempts have been made to provide apparatus which can be used with the threading dies to dispense a predetermined quantity of lubricant to the dies on an automatic basis. Until the present time, however, prior art apparatus has tended to be rather complex, expensive to fabricate, and difficult to keep in adjustment. Pressure chambers have been used, spring loaded dispensers are not uncommon, and a host of other relatively sophisticated apparatus will be encountered by anyone searching the prior art for an answer to the problem discussed above; however, it has remained for the present invention to provide a relatively foolproof, simple, efficient, economical apparatus for automatically dispensing measured amounts of lubricant to a threading die at predetermined intervals.

DESCRIPTION OF THE DRAWINGS

Apparatus embodying one form of the present invention is disclosed in the following description which is to be read in conjunction with the accompanying drawings wherein like reference characters designate like parts in all views and wherein.

GENERAL DESCRIPTION OF THE APPARATUS

Figure 1:
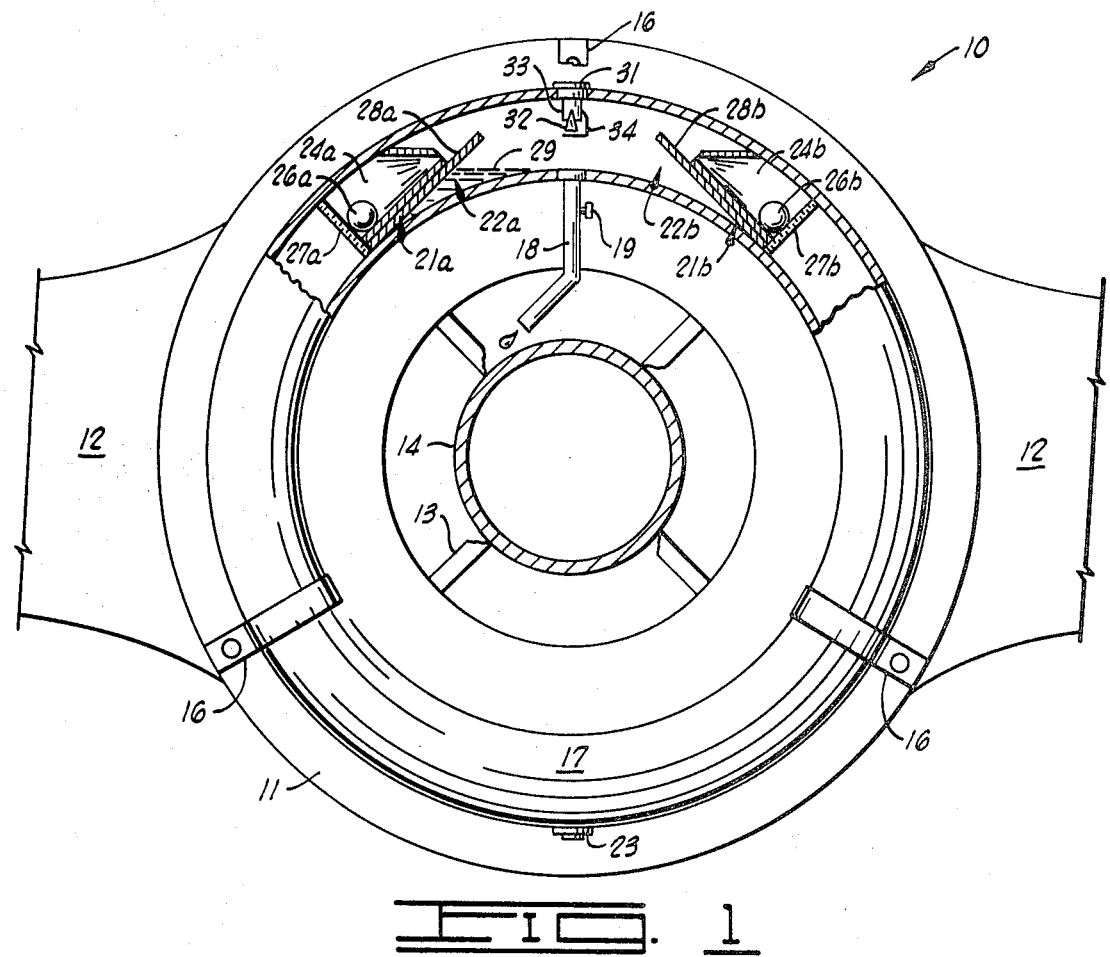
FIG. 1 is a plan view of one form of apparatus embodying the present invention with a portion of the apparatus removed to show the internal elements of the apparatus.

Turning now to the drawings and in particular to FIG. 1, there is shown a pipe threading tool indicated generally by the number 10 which includes a torus shaped body member 11 on which are mounted handles 12. A plurality of threading dies 13 project radially inwardly from body member 11 into cutting engagement with a section of pipe 14. Mounted on body member 11 by mounting means, such as clamps 16, is a fluid reservoir 17. A dispensing tube 18 having a manually operable valve 19 mounted therein, communicates with the interior of reservoir 17 in such a position as to provide lubrication to threading dies 13 as the dies are rotated during the threading operation.

As generally constituted, the method of operation of the apparatus shown in FIG. 1 is as follows. Reservoir 17, being locked to body member 11 by clamps 16, turns with the body member. Internal elements within the reservoir, which will be discussed hereinafter, function to cause a metered amount of lubricant to pass through dispensing tube 18 at such time as the dispensing tube is in the high, or 12 o'clock, position as shown in FIG. 1. This operation is repeated with each rotation of the reservoir so that a regular supply of lubricant is provided to threading dies 13 through the course of the threading operation.

The specific apparatus by which this dispensing operation is accomplished will now be discussed.

DETAILED DESCRIPTION OF THE APPARATUS

In the discussion heretofore it has been noted that it is the function of the apparatus to dispense a limited amount of lubricant when reservoir 17 is positioned so that dispensing tube 18 is in its downward position. The apparatus by which this is achieved is shown in the cutaway portions of FIG. 1 and the following discussion will be directed, in general, to the elements shown in this figure to the left of center. Where these elements have counterparts to the right of center, the left hand elements will be designated "a" while their right hand counterparts will be designated "b."

In FIG. 1 there is shown valve means indicated generally by the number 21a which operate in cooperation with trap means indicated generally by the number 22a. These two elements are utilized to carry a small amount of the lubricant which is held in the lower portion of reservoir 17 to the upper portion of the reservoir as the reservoir rotates in a clockwise direction. As the supply of lubricant within reservoir 17 is exhausted it is replaced through a filler cap 23.

Valve means 21a includes a skewed, frustoconical valve member 24a in the interior of which there is movably disposed a ball 26a which is larger in diameter than the narrow end of valve member 24a. The base of valve member 24a is covered by an arrestor plate 27a which has a plurality of perforations or channels formed therein to allow lubricant to flow freely from side to side through the plate. Because of the presence of the perforated plate, ball 26a is kept in the interior of valve member 24a while at the same time fluid is allowed to flow freely through the valve member when the operation of the device so requires.

Trap means 22a includes a septum plate 28a which is mounted in the interior of chamber 17 at an acute angle with the inner wall of the torus. Septum 28a extends from the inner wall of the torus to a point spaced from the outer wall and extends completely across the interior of reservoir 17 from side to side, as viewed in FIG. 1. The other side of trap means 22a is provided by a portion of the inner wall of reservoir 17 so that upon movement of the reservoir in a clockwise direction lubricant will be trapped within trap chamber 22a, as shown in FIG. 1 by the numeral 29.

As lubricant passes out of reservoir 17, it will be necessary to allow air to enter the reservoir to prevent the formation of a vacuum therein. For this purpose an air vent 31 is provided on the outside surface of reservoir 17 at a position immediately opposite dispensing tube 18. In order to close vent 31 when the vent is below the surface of liquid within chamber 17, a gravity operated check valve is provided. This valve includes a conical valve member 32 which is held against undue lateral movement by a valve guide 33. A metal wire 34 projects toward the interior of reservoir 17 from the outer edge of guide 33 and projects over valve member 32 to prevent the valve member from falling out of the guide when the reservoir is in the position shown in FIG. 1.

OPERATION OF THE APPARATUS

Figure 2:
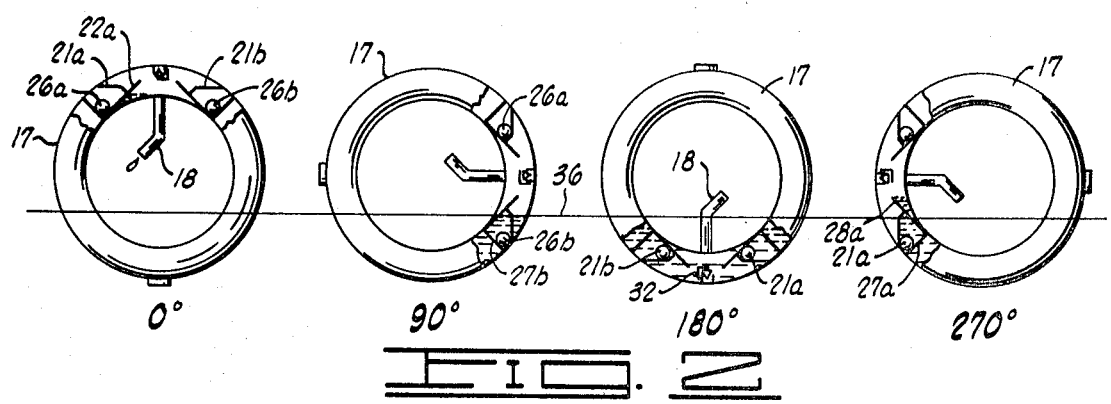
FIG. 2 is a schematic view of reduced size showing a series of positions of the internal members of the apparatus shown in FIG. 1 as the apparatus is rotated about a central axis.

FIG. 2 can be relied upon for a clearer understanding of the operation of the apparatus disclosed in FIG. 1. In FIG. 2 there are shown in a very schematic fashion the positions of reservoir 17 as it is turned in 90 degree increments through one complete revolution. The lubricant level inside reservoir 17 during the operation is indicated for each of the four positions by the line 36.

Let it be assumed that the operation of the present device begins in the 0° position as shown in FIG. 2. When the device is in that position, both of the balls 26a and 26b will be positioned as shown with both valve means 21a and 21b open and a small quantity of lubricant carried by trap means 22a. As the reservoir moves in a clockwise direction, this quantity of lubricant will be discharged through dispensing tube 18 as it comes on an overcenter position.

In the 90° position, ball 26a has moved to close its associated valve, while corresponding ball 26b remains in the open position to allow lubricant to flow into the area immediately surrounding the trap chamber. This flow occurs due to the channels which are formed in arrestor plate 27b.

When reservoir 17 assumes the position shown in the 180 degree view, both valve means 21a and 21b are closed, as shown, to prevent the hydrostatic pressure of lubricant from forcing lubricant out of dispensing tube 18 when the level of the lubricant with reservoir 17 is above the end of the tube. In addition, valve member 32 is moved by gravity to close air vent 21 thereby eliminating the possibility of leakage through the air vent.

In the 270° position of reservoir 17, septum plate 28a has moved upward past the surface of the lubricant and has trapped therein a small quantity of the lubricant for later discharge through tube 18 as the tube moves into the 0° position. Once again, valve means 21a is open and any lubricant which might otherwise be trapped above the level of the lubricant within the reservoir is allowed to flow downwardly through the action of gravity through the perforations of arrestor plate 27a.

It will at once be obvious that a number of changes and alterations may be made in the structure shown in the drawings without departing from the spirit and scope of the present invention. For instance, if desired, septum plate 28 can be dispensed with entirely, if the trap volume which would be supplied by valve member 24 would be sufficient. Moreover, valve member 24 may be made in the form of a uniform frustocone rather than the skewed, frustoconical shape it is shown to have in the drawings. Thus, it will be seen that the embodiment described herein is presented by way of example only and that many changes and modifications thereto may be made without departing from the spirit of the invention and the scope of the annexed claims.

What I claim is:

1. Fluid dispensing apparatus comprising:
   a. a rotatably mounted reservoir for said fluid, said reservoir having formed therein a vent and a fluid outlet;
   b. valve means secured in the interior of said reservoir adjacent said fluid outlet for preventing communication between said fluid outlet and the major portion of said reservoir when said reservoir is in a first position during rotation; and
   c. fluid trap means mounted within said reservoir adjacent said fluid outlet and said valve means for entrapping a portion of the fluid within said reservoir when the reservoir is in said first position and carrying the fluid from said first position to a second position at which position the fluid is discharged through the fluid outlet at another time during rotation of said reservoir.

2. The apparatus defined in claim 1 wherein said reservoir is torus shaped, and wherein said fluid outlet is located thereon in the central portion of the radially inner surface of the torus.

3. The apparatus defined in claim 2 further characterized by a dispensing tube mounted on the reservoir and in communication with the interior thereof through said fluid outlet.

4. The apparatus defined in claim 1 wherein said reservoir is torus shaped and wherein said vent is located therein in the central portion of the outer surface of the torus.

5. The apparatus defined in claim 1 wherein a gravity operated check valve is mounted within said reservoir in a position to close the vent when the reservoir is in the first position.

6. The apparatus defined in claim 1 wherein said valve means comprises:
   a. a skewed, frustoconical valve member with the base thereof extending across the interior of the reservoir and the top thereof extending from the base in a direction toward said fluid outlet, said top being formed into a valve seat;
   b. a movable ball within said valve member for alternately opening and closing said valve; and
   c. an arrestor plate mounted within said reservoir adjacent said valve member for preventing the ball from moving away from the interior of said valve member.

7. The apparatus defined in claim 6 wherein said arrestor plate comprises a plate having a plurality of fluid channels formed therein.

8. The apparatus defined in claim 6 wherein said reservoir is torus shaped, and wherein said trap means comprises a septum mounted within said reservoir at one side of the valve means, said septum forming an angle with the sides of the reservoir and extending thereacross from side to side of the reservoir to a position spaced from the radially outer surface of said chamber.

9. The apparatus defined in claim 8 wherein said valve means comprises:
   a. a skewed, frustoconical valve member with the base thereof extending across the interior of the reservoir and the top thereof extending from the base in a direction toward said fluid outlet, said top being formed into a valve seat;
   b. a movable ball within said valve member for alternately opening and closing said valve; and
   c. an arrestor plate mounted within said reservoir adjacent said valve member for preventing the ball from moving outside the interior of said valve member.

10. The apparatus defined in claim 9 wherein a gravity operated check valve is mounted within said reservoir in a position to close the vent when the reservoir is in the first position.

11. In combination:
    a. a pipe threading tool comprising:
       1. a torus shaped body member, and
       2. a plurality of threaded dies projecting radially inward from the central portion of said body member;
    b. lubricant dispensing means mounted on said body member for dispensing lubricant in the vicinity of one of the threading dies, said dispensing means comprising:
       1. a lubricant reservoir, said reservoir having formed therein a vent and a fluid outlet,
       2. valve means secured in the interior of the reservoir adjacent the fluid outlet for preventing communication between the fluid outlet and the major portion of the interior of the reservoir when the reservoir is in a first position,
       3. a dispensing tube mounted on the exterior of said reservoir and in communication with the interior thereof through said fluid outlet, the outer end of said dispensing tube being positioned adjacent one of said threaded dies, and
       4. fluid trap means mounted within said reservoir adjacent the fluid outlet and the valve means for entrapping a portion of the lubricant within said reservoir when the reservoir is in the first position and carrying the lubricant from said first to a second position at which position the fluid is discharged through the fluid outlet; and c. means for mounting lubricant dispensing means on the pipe threading tool.

12. The apparatus defined in claim 11 wherein said valve means comprises:
   a. a skewed, frustoconical valve member with the base thereof extending across the interior of the reservoir and the top thereof extending from the base in a direction toward said fluid outlet, said top being formed into a valve seat;
   b. a movable ball within said valve member for alternately opening and closing said valve; and
   c. an arrestor mounted within said reservoir adjacent said valve member for preventing the ball from moving outside the interior of said valve member.

13. The apparatus defined in claim 12 wherein said trap means comprises a septum mounted within said chamber at one side of the valve means, said septum forming an angle with the sides of the chamber and extending thereacross from side to side of the chamber to a position spaced from the outer surface of said chamber.

* * * * *